United States Patent
Gelzer et al.

(10) Patent No.: US 11,702,982 B2
(45) Date of Patent: Jul. 18, 2023

(54) BLADE FRAGMENT BARRIER FOR AIRCRAFT ENGINE INLET COWL

(71) Applicant: The Boeing Company, Chicago, IL (US)

(72) Inventors: Daniel F. Gelzer, Bellevue, WA (US); Jennifer Bender Zielinski, Kent, WA (US)

(73) Assignee: THE BOEING COMPANY, Arlington, VA (US)

( * ) Notice: Subject to any disclaimer, the term of this patent is extended or adjusted under 35 U.S.C. 154(b) by 686 days.

(21) Appl. No.: 16/663,075

(22) Filed: Oct. 24, 2019

(65) Prior Publication Data
US 2021/0123384 A1 Apr. 29, 2021

(51) Int. Cl.
| | |
|---|---|
| F02C 7/05 | (2006.01) |
| F01D 21/04 | (2006.01) |
| F01D 25/24 | (2006.01) |
| B23P 15/00 | (2006.01) |
| B64D 29/06 | (2006.01) |
| B64D 29/00 | (2006.01) |
| B23P 6/00 | (2006.01) |
| B64D 33/02 | (2006.01) |

(52) U.S. Cl.
CPC ............... *F02C 7/05* (2013.01); *B23P 6/005* (2013.01); *B23P 15/008* (2013.01); *B64D 29/00* (2013.01); *B64D 29/06* (2013.01); *F01D 21/045* (2013.01); *F01D 25/24* (2013.01); *B23P 2700/01* (2013.01); *B64D 2033/022* (2013.01); *F05D 2230/80* (2013.01); *F05D 2240/14* (2013.01); *F05D 2250/283* (2013.01); *Y10T 29/4932* (2015.01)

(58) Field of Classification Search
CPC .......... F01D 21/045; F01D 25/24; F02C 7/05; F02C 7/055; F05D 2240/14; F05D 2230/80; B64C 7/02; B64D 29/00; B64D 29/02; B64D 29/06; B64D 33/02; B64D 2033/022; B23P 6/002; B23P 6/005; B23P 6/045; B23P 2700/01; B23P 15/008; Y10T 29/4932
See application file for complete search history.

(56) References Cited

U.S. PATENT DOCUMENTS

| | | | | |
|---|---|---|---|---|
| 6,129,311 A | * | 10/2000 | Welch ................ | B29D 99/0089 244/1 N |
| 10,589,869 B2 | * | 3/2020 | Wittman ................ | B64D 33/02 |

(Continued)

*Primary Examiner* — Christopher Verdier
(74) *Attorney, Agent, or Firm* — Alleman Hall Creasman & Tuttle LLP

(57) ABSTRACT

A barrier device is provided for an inlet cowl for an aircraft engine including an inner barrel circumferentially surrounding an opening in the inlet cowl formed along an axis of rotation of the aircraft engine, through which air passes to the aircraft engine, the inner barrel including a face sheet disposed on a radially inward side of the inner barrel relative to the axis. The barrier device includes a containment doubler of the inner barrel, disposed on a radially outward side of the inner barrel, and a blade fragment barrier including one or more strips disposed between the containment doubler and the face sheet, so as to extend circumferentially at least partially around the opening and to occupy a radial distance between the containment doubler and the face sheet.

20 Claims, 8 Drawing Sheets

(56) References Cited

U.S. PATENT DOCUMENTS

| | | | |
|---|---|---|---|
| 2012/0091285 A1* | 4/2012 | Porte | F02C 7/04 |
| | | | 156/243 |
| 2013/0302154 A1* | 11/2013 | Finlayson | F01D 21/045 |
| | | | 415/200 |
| 2015/0110603 A1* | 4/2015 | Biset | F02C 7/045 |
| | | | 415/119 |
| 2018/0243830 A1* | 8/2018 | Kottilingam | B29C 64/165 |
| 2022/0042455 A1* | 2/2022 | Guillois | B64D 33/02 |

* cited by examiner

BLADE FRAGMENT BARRIER FOR AIRCRAFT ENGINE INLET COWL

FIELD

This invention relates generally to aerospace engineering, and more specifically, to structural design of aircraft engine inlet cowls.

BACKGROUND

Aircraft commonly employ turbine engines with large fans having a plurality of fan blades distributed around a shaft inside an engine fan case. In a "fan blade out" event, damaged engine blades or engine blade fragments break free and are released from the engine at high speeds. Such blade fragments can be sent forward of the engine fan case and into the inlet compartment, where they can pierce the inlet panels surrounding the inlet opening. Piercing the inlet panels can result in not only damage to the panels, but also in blade fragments escaping the inlet, endangering the rest of the aircraft. One conventional solution to address this problem is to add a containment doubler to cover the radial outside of the inlet panels, thereby blocking blade fragments from piercing through and exiting the inlet panels. However, the extent of coverage provided by the containment doubler is constrained by its geometry. For example, the containment doubler is not able to inhibit passage of fragments forward of the forward edge of the containment doubler itself, where the inlet panel is unprotected by the containment doubler. Another solution is to place a metal hook in front of the fan blades, inside the engine case. However, the trajectory of a blade fragment may miss the hook and still reach the inlet panel, causing a hazard. Furthermore, a fragment colliding with the hook may be returned toward the fan, which could break additional fan blades loose.

SUMMARY

To address the above issues, according to one aspect of the present disclosure, a barrier device is provided herein for an inlet cowl for an aircraft engine. In this aspect, the aircraft engine includes an inner barrel circumferentially surrounding an opening in the inlet cowl formed along an axis of rotation of the aircraft engine, through which air passes to the aircraft engine, and the inner barrel includes a face sheet disposed on a radially inward side of the inner barrel relative to the axis. The barrier device includes a containment doubler of the inner barrel, disposed on a radially outward side of the inner barrel. The barrier device also includes a blade fragment barrier including one or more strips disposed between the containment doubler and the face sheet, so as to extend circumferentially at least partially around the opening and to occupy a radial distance between the containment doubler and the face sheet.

Another aspect of the present disclosure relates to an inlet cowl for an aircraft engine. In this aspect, the inlet cowl includes an inner barrel circumferentially surrounding an opening in the inlet cowl formed along an axis of rotation of the aircraft engine, through which air passes to the aircraft engine. The inner barrel includes a face sheet disposed on a radially inward side of the inner barrel relative to the axis, and a containment doubler disposed radially outward of the face sheet. The inlet cowl further includes a blade fragment barrier including one or more strips disposed between the containment doubler and the face sheet, so as to extend circumferentially at least partially around the opening and to occupy a radial distance between the containment doubler and the face sheet.

Still another aspect of the present disclosure relates to a method for retrofitting a blade fragment barrier in an inlet cowl for an aircraft engine. In this aspect, the aircraft engine includes an inner barrel circumferentially surrounding an opening in the inlet cowl formed along an axis of rotation of the aircraft engine, through which air passes to the aircraft engine. The inner barrel includes a face sheet disposed on a radially inward side of the inner barrel relative to the axis, a containment doubler disposed radially outward of the face sheet, and a core configured to be disposed between the containment doubler and the face sheet. The method includes filling a portion of the core with filler material. The method includes inserting the blade fragment barrier formed of one or more strips into the filler material so as to extend circumferentially at least partially around the opening and to occupy a radial distance between the containment doubler and the face sheet, such that the filler material is positioned forward of the blade fragment barrier. The method further includes securing at least a portion of the blade fragment barrier with the containment doubler and the face sheet.

The features, functions, and advantages that have been discussed can be achieved independently in various embodiments or may be combined in yet other embodiments, further details of which can be seen with reference to the following description and drawings.

DETAILED DESCRIPTION

A barrier device for blocking fan blade fragments from an aircraft engine is disclosed, an example configuration of which contains a blade fragment barrier installed within an inlet cowl inner barrel. This blade fragment barrier may serve to catch blade fragments that would otherwise pass through the inlet cowl when exiting the engine fan case, posing a hazard to the rest of the aircraft. As will be described in more detail below, the inlet cowl may already include a containment doubler and can then be retrofitted with the blade fragment barrier to form the barrier device; in other implementations, new inlet cowls may be installed with the barrier device during initial assembly.

Figure 1:
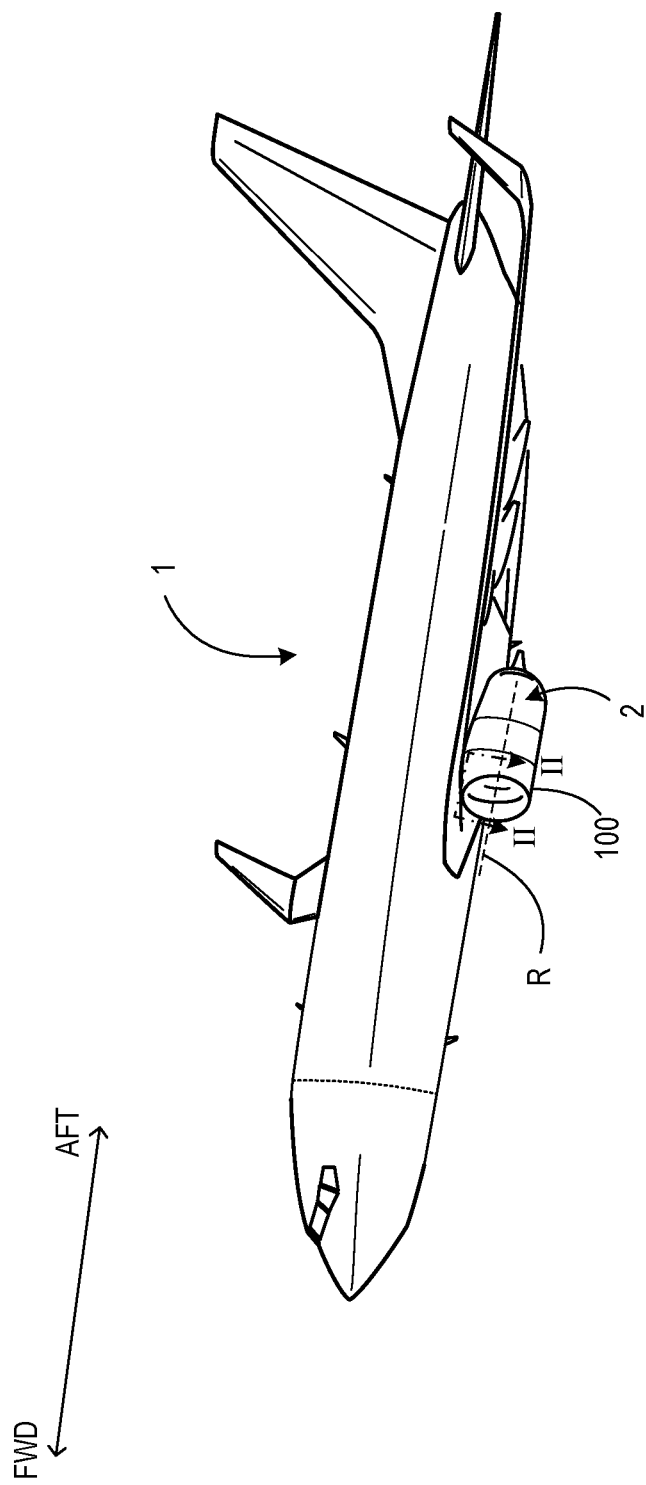
FIG. 1 illustrates an aircraft including an example inlet cowl according to the present disclosure.
Figure 2:
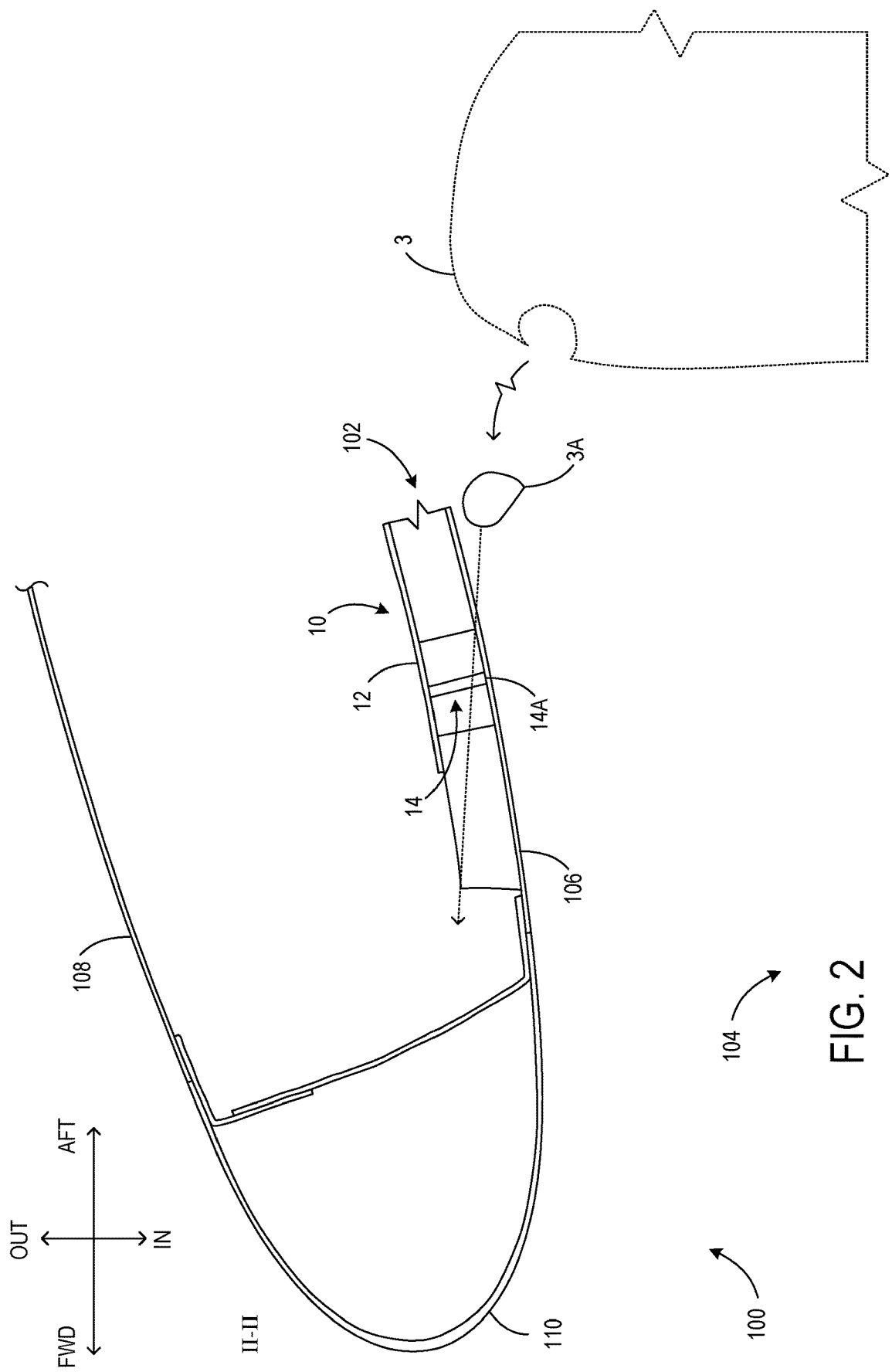
FIG. 2 is a cross-sectional side view of a forward portion of the inlet cowl of the aircraft of FIG. 1.

FIG. 1 illustrates an aircraft 1 including an example inlet cowl according to the present disclosure. The aircraft 1 may include an engine 2 rotatable to generate propulsion for the aircraft 1. An inlet cowl 100 for the aircraft engine 2 may be disposed forward of the engine 2 to guide airflow to the engine 2 and provide an aerodynamic shape. FIG. 2 is a cross-sectional side view II-II of a forward portion of the inlet cowl 100. The location of the cross-section II-II is indicated in FIG. 1. As shown in FIG. 2, a blade 3 or a fragment 3A of the blade 3 may come free from a fan of the engine 2 and travel forward and outward from the engine 2. Here, the inlet cowl 100 comprises an inner barrel 102 circumferentially surrounding an opening 104 in the inlet cowl 100 formed along an axis of rotation R (see FIG. 1) of the aircraft engine 2, through which air passes to the aircraft engine 2.

The inner barrel 102 includes a face sheet 106 and a containment doubler 12. The face sheet 106 is disposed on a radially inward side of the inner barrel 102 relative to the axis R. The face sheet 106 may be referred to as a skin of the inner barrel and may be perforated. The containment doubler 12 is disposed radially outward of the face sheet 106. The inlet cowl 100 may further comprise an outer barrel 108 disposed radially outward of the inner barrel 102. However, some inlet cowls only have one barrel (e.g., inner barrel 102) rather than an inner barrel 102 and an outer barrel 108. The inlet cowl 100 may further include a lip skin 110 disposed at a forward end of the inlet cowl 100

In order to block blade fragments 3A or other debris from exiting the engine via the inner barrel 102, the containment doubler 12 may be a plate made of a strong material such as stainless steel, aluminum, titanium, or composite, to provide a few examples. Providing protection from projectiles using a containment doubler 12 has a trade-off with weight, which is carefully managed in an aircraft. In particular, adding extra weight to a forward end of the inlet cowl 100 would negatively impact the aircraft 1. As shown in FIG. 2, the blade fragment 3A is on a trajectory that would pass in front of the containment doubler 12. However, in view of the above, extending the containment doubler 12 further forward for fan blade containment may incur unacceptable ramifications.

According to the present disclosure, the inlet cowl 100 additionally comprises a blade fragment barrier 14 comprising one or more strips 14A disposed between the containment doubler 12 and the face sheet 106, so as to extend circumferentially at least partially around the opening 104 and to occupy a radial distance between the containment doubler 12 and the face sheet 106. A barrier device 10 comprises the containment doubler 12 and the blade fragment barrier 14. The blade fragment barrier 14 may block the blade fragment 3A on its trajectory in the illustrated example. The extension of the blade fragment barrier 14 in a different direction from the containment doubler 12 may increase the blockable range of the barrier device 10 without extending the containment doubler 12 forward, adding another containment doubler 12 in a radial layer, increasing the thickness of the containment doubler, etc. Even in a case where the radial height of the blade fragment barrier 14 is very short compared to the overall area of the containment doubler 12, the additional weight incurred by adding the blade fragment barrier 14 can be used effectively to provide additional projectile protection.

Figure 3:
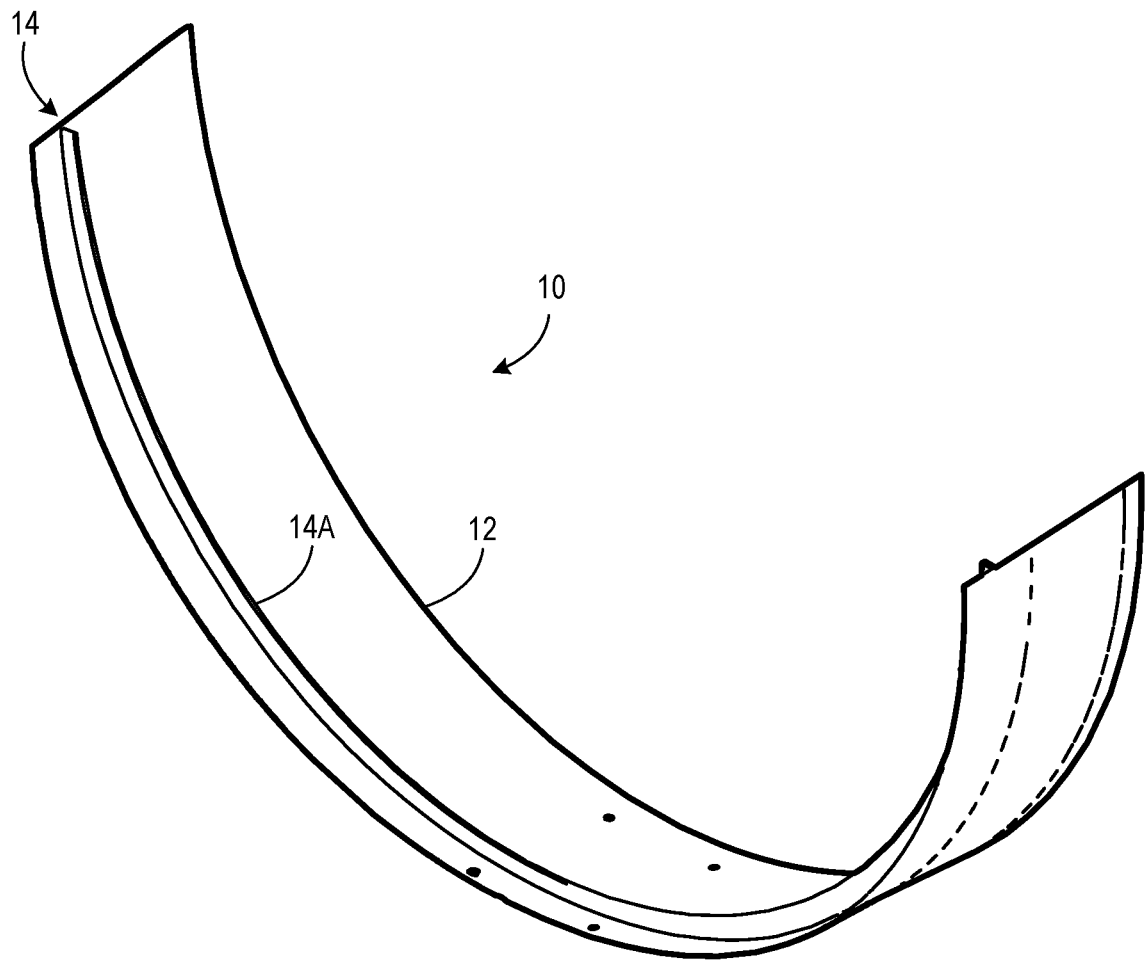
FIG. 3 is a perspective view of a barrier device of the inlet cowl of FIG. 2.

FIG. 3 is a perspective view of the barrier device 10 of the inlet cowl 100 of FIG. 2. The inlet cowl 100 may have an inner barrel 102 which is formed integrally around the opening 104, or the inner barrel 102 may be assembled from two or more inner barrel panels. The example illustrated in FIG. 3 may be a barrier device 10 to be installed in one of two inner barrel panels assembled to form the inner barrel 102. Thus, when two barrier devices 10 are fully assembled in the inner barrel 102, the blade fragment barrier 14 may circumferentially extend 360° around the face sheet 106. However, if other means for blocking the blade fragments 3A are included, then gaps in the blade fragment barrier 14 may be acceptable. Further, it will be appreciated that in the case of an integral inner barrel 102 which is not divided into multiple panels, the blade fragment barrier 14 and/or the containment doubler 12 may be formed as a ring and placed around the face sheet 106 without being divided into pieces.

Figure 4:
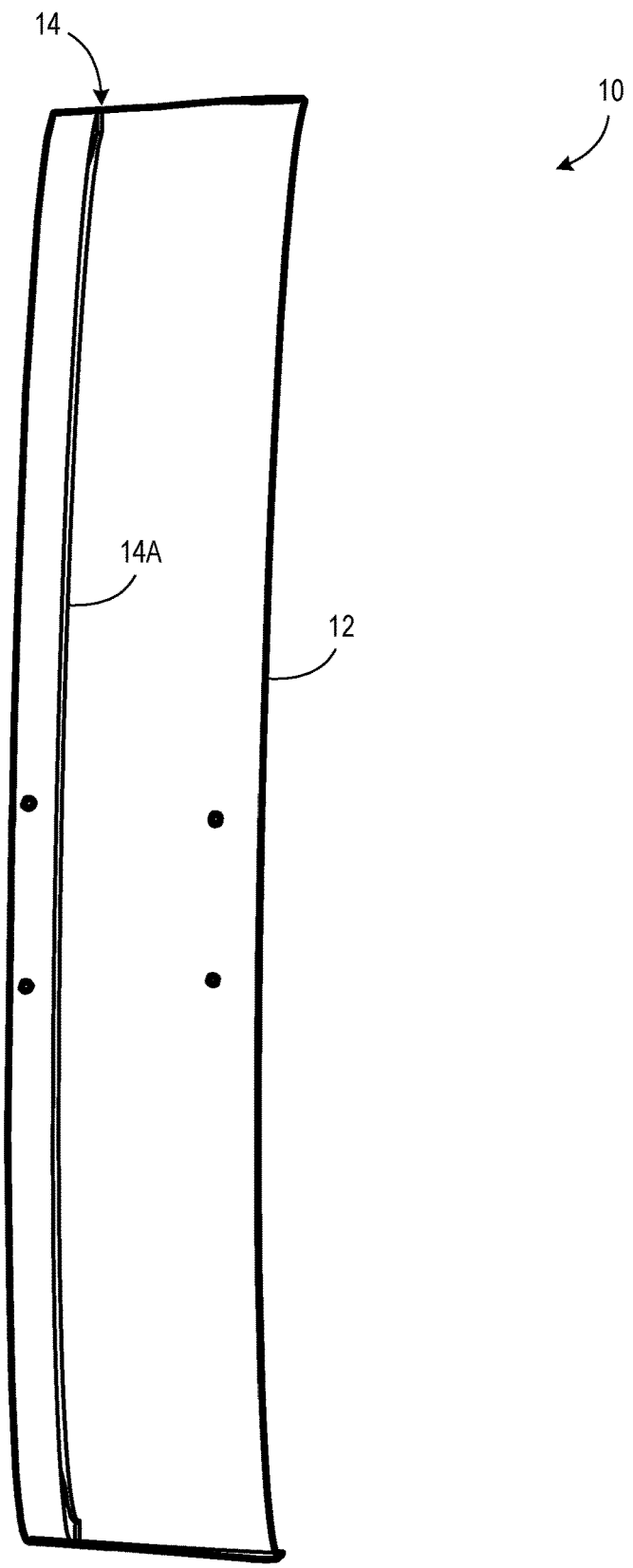
FIG. 4 is a side view of the barrier device of FIG. 3.
Figure 5:
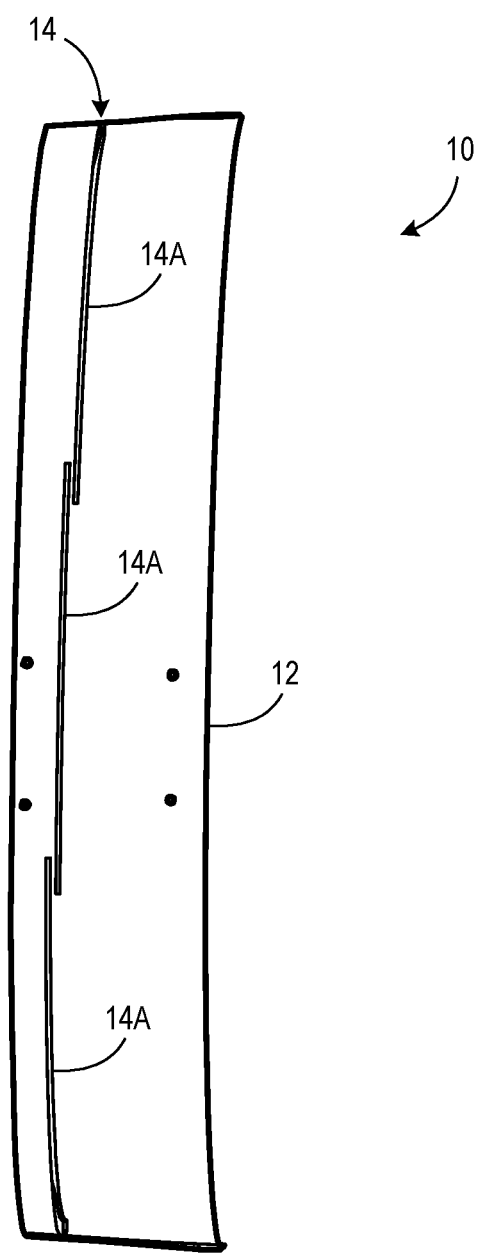
FIG. 5 is a side view of the barrier device of FIG. 3, having a plurality of strips.

FIGS. 4 and 5 are side views of the barrier device 10 of FIG. 3. In FIG. 4, the blade fragment barrier 14 includes only one strip 14A per inner barrel panel, or one strip 14A per inner barrel 102. In FIG. 5, the one or more strips 14A may include a plurality of strips 14A. Here, three strips 14A are shown by way of example. Further, each of the plurality of strips 14A may overlap fore-to-aft with a neighboring strip 14A at each end thereof. The overlapping region may increase the structural integrity of the ends of the strips 14A and prevent fragments 3A from bending the ends and piercing through the inner barrel 102.

As can be seen, the blade fragment barrier 14 may be provided forward of a length midpoint of the containment doubler 12 and aft of a forward edge of the containment doubler 12. Thus, the blade fragment barrier 14 may be located near the forward edge of the containment doubler 12 to more effectively cut off forward fragment trajectories, but a lip at the forward edge of the containment doubler 12 may allow the containment doubler 12 to more securely hold the blade fragment barrier 14 in place. The precise distance from the forward edge may depend on the expected fragment size for the particular engine 2, or the amount of filler material 16 to be used forward of the blade fragment barrier 14. Accordingly, in some implementations, the blade fragment barrier 14 may be located at least 2.5 cm from the forward edge of the containment doubler 12. Alternatively, or additionally, the blade fragment barrier 14 may be located at a position approximately 10-50% of the fore-to-aft length of the containment doubler 12. The blade fragment barrier 14 may be approximately 1-3 mm thick, depending on expected fragment characteristics such as size, weight, velocity, quantity, helical angle, etc., in addition to the material properties of the blade fragment barrier 14. The one or more strips 14A may be metallic. For example, the strips 14A may be steel, or aluminum or titanium and their alloys, among other metals. Alternatively, non-metallic materials such as plastic or a composite may be used. Non-metallic materials may be less robust than metal, but may be supplemented by other components of the barrier device 10, as discussed below.

Figure 6A:
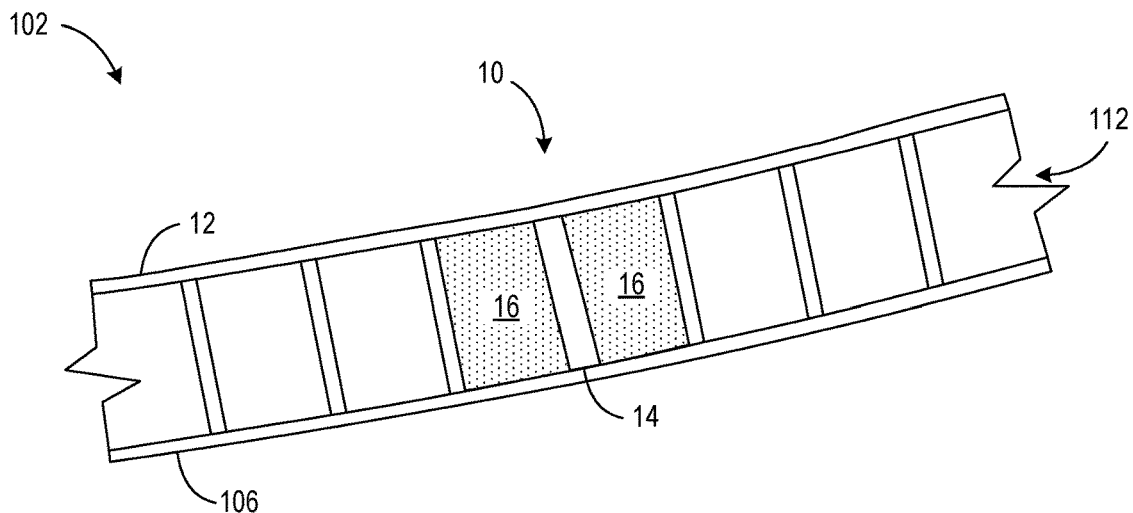
FIGS. 6A-6D are close-up cross-sectional views of the barrier device of FIG. 3 installed in a core, in which a blade fragment barrier is installed at various angles.
Figure 6B:
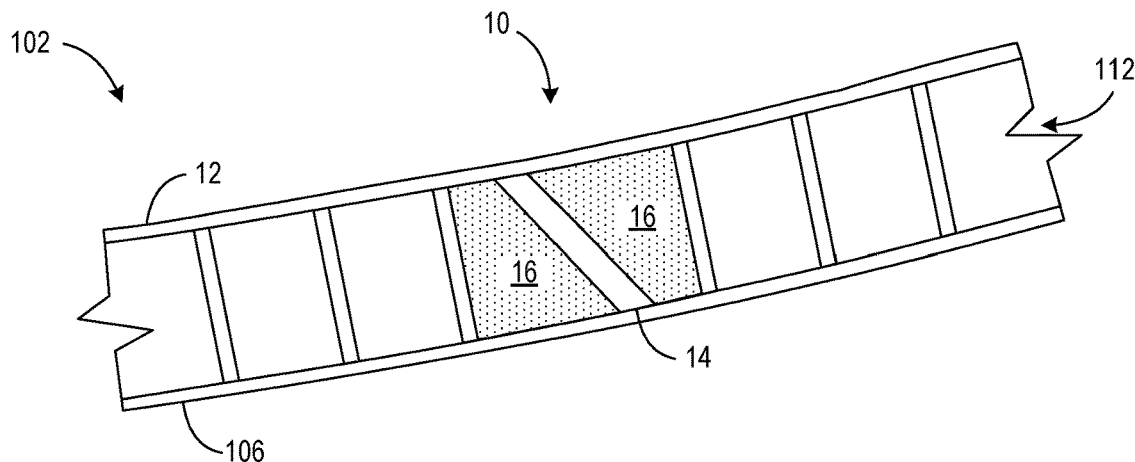
Figure 6C:
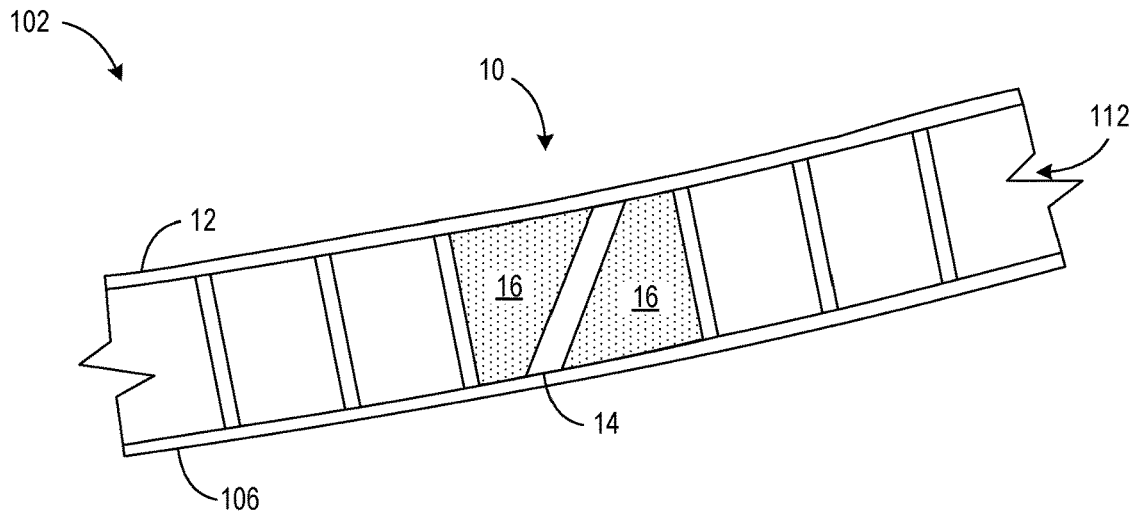
Figure 6D:
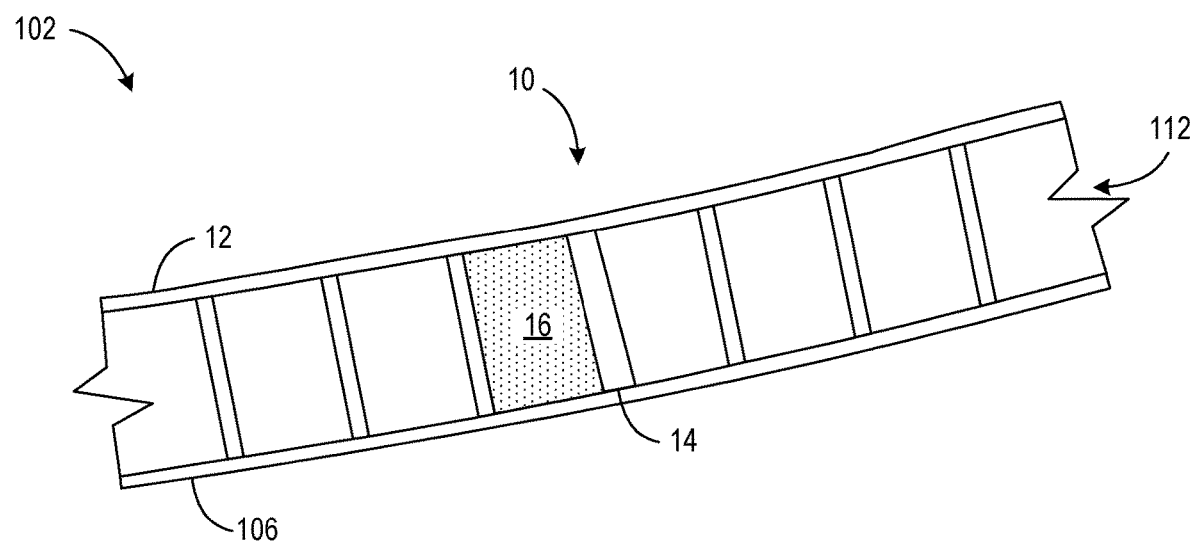
Figure 7:
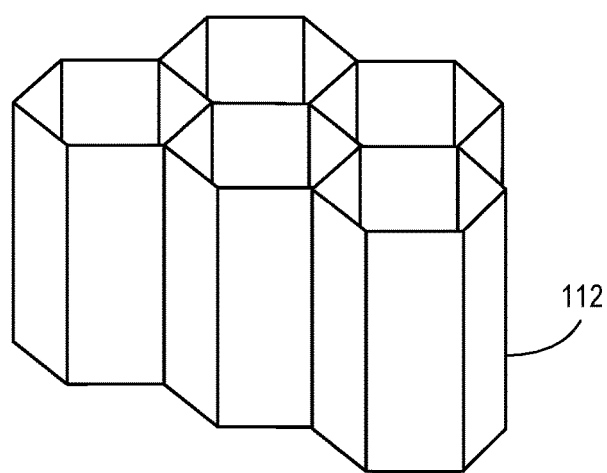
FIG. 7 is an illustration of an example honeycomb pattern of the core of FIGS. 6A-6D.

FIGS. 6A-6D are close-up cross-sectional views of the barrier device 10 of FIG. 3 installed in a core, in which the blade fragment barrier 14 is installed at various angles. The inner barrel 102 may further comprise a core 112 disposed between the containment doubler 12 and the face sheet 106. The core 112 may be made of aluminum, for example. Alternatively, a dense core in which the pattern of the core is smaller than a typical core such that more material is used per area (e.g., an area typically having 5 honeycomb cells may have 10 honeycomb cells with half the diameter in a dense core) may be utilized to provide additional support. The dense core may be, for example, composite or metallic. The core 112 may be provided to dampen noise generated by the engine 2 when paired with a perforated face sheet 106, forming an acoustic panel. As shown in FIG. 6A-6C, a thickness of the one or more strips 14A is greater than a cell wall thickness of the core 112. FIG. 7 is an illustration of an example honeycomb pattern of the core 112; however, other patterns may be utilized. For example, the core 112 may have a square grid or circular pattern. The one or more strips 14A may be embedded into the core 112 in a variety of manners, as exemplified in each of FIGS. 6A-6C. The radial extent of the blade fragment barrier 14 may be limited by the thickness of the core 112, which may be approximately 1-5 cm, in order to avoid creating turbulence.

As shown in FIG. 6A, the blade fragment barrier 14 may be provided substantially perpendicularly to respective surfaces of the face sheet 106 and the containment doubler 12. The perpendicular orientation may provide superior stabilization of the blade fragment barrier 14, reducing instances of failure when impacted by the fragment 3A. As shown in FIG. 6B, the blade fragment barrier 14 may instead be tilted forward. The forward slant may increase a trapping effect of the barrier device 10, by trapping the fragment 3A between the containment doubler 12 and the blade fragment barrier 14 and reducing the chance of the fragment 3A ricocheting elsewhere. Alternatively, as shown in FIG. 6C, the blade fragment barrier 14 may be tilted rearward (aft).

Regardless of the positioning of the blade fragment barrier 14, the barrier device 10 may further comprise filler material 16 positioned forward of the blade fragment barrier 14. The one or more strips 14A may be embedded into the filler material 16 and may thereby be held in place. The examples shown in FIGS. 6A-6C illustrate filler material 16 positioned forward and aft of the blade fragment barrier 14; however, as shown in FIG. 6D, the filler material 16 may be positioned only forward of the blade fragment barrier 14. This configuration may suppress an increase in weight when installing the barrier device 10. It will be appreciated that the slant feature shown in FIGS. 6B and 6C may be combined with the filler material 16 placement FIG. 6D.

The filler material may include at least one of the group consisting of potting, adhesive, foaming adhesive, and epoxy. For example, the potting may include an epoxy resin, one or more inert fillers, and a curing agent. A denser filler material such as potting may increase efficacy, but a lighter filler material such as a foaming adhesive may suppress weight increase of the inlet cowl 100. In the case of a non-metallic blade fragment barrier 14, the filler material may additionally impede the fragments 3A to supplement the blade fragment barrier 14. Alternatively, the blade fragment barrier 14 may be positioned without a filler material by securing the blade fragment barrier 14 to the containment doubler 12, the core 112, and/or the face sheet 106 by an adhesive, welding, fasteners, etc.

Figure 8:
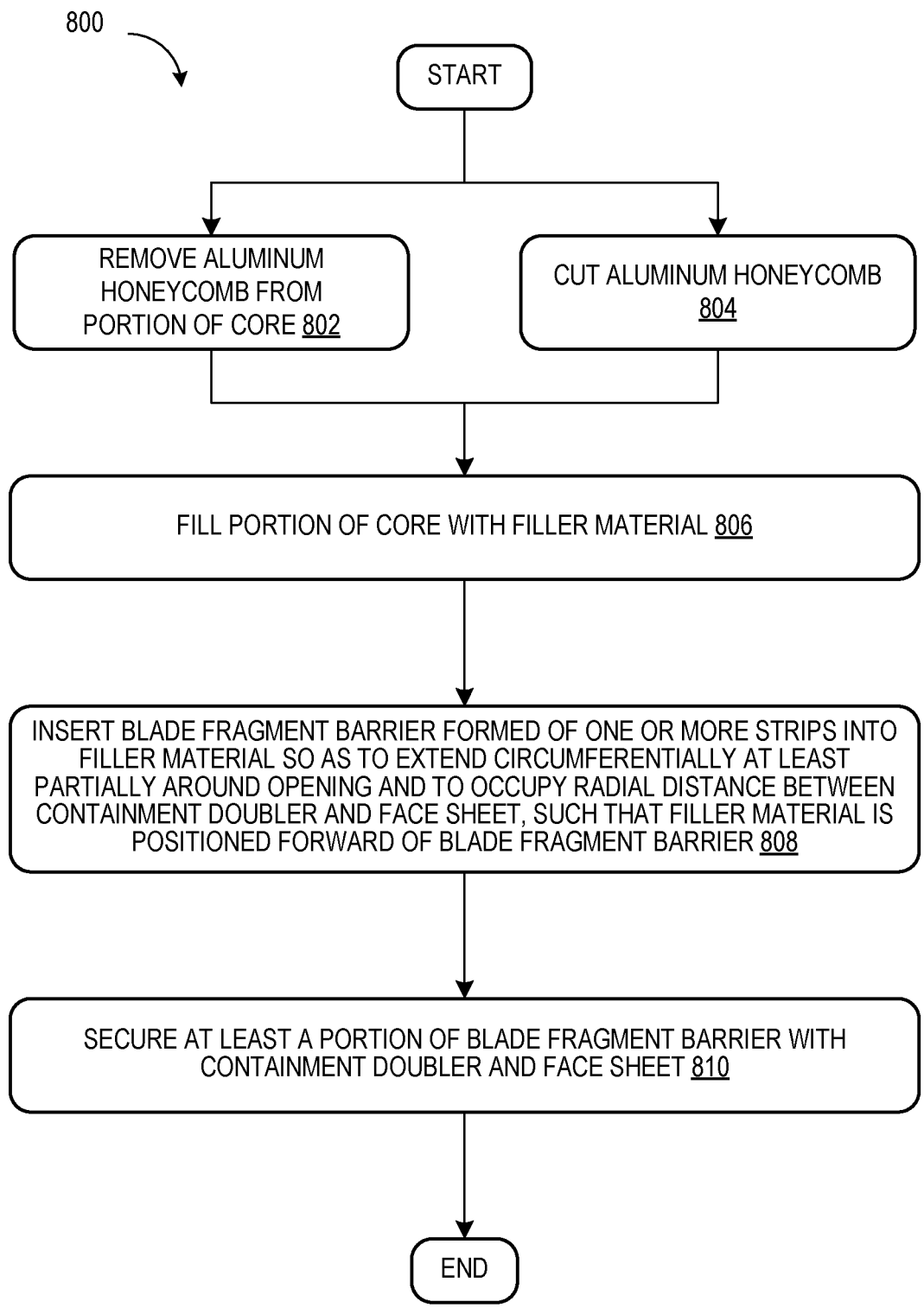
FIG. 8 is a flowchart of a method for retrofitting a blade fragment barrier in an inlet cowl for an aircraft engine.

FIG. 8 is a flowchart of a method 800 for retrofitting a blade fragment barrier in an inlet cowl for an aircraft engine. The following description of method 800 is provided with reference to the inlet cowl 100 and barrier device 10 described above and shown in FIG. 2. It will be appreciated that method 800 may also be performed in other contexts using other suitable components.

The method 800 is for retrofitting a blade fragment barrier in an inlet cowl for an aircraft engine including an inner barrel circumferentially surrounding an opening in the inlet cowl formed along an axis of rotation of the aircraft engine, through which air passes to the aircraft engine. The inner barrel includes a face sheet disposed on a radially inward side of the inner barrel relative to the axis, a containment doubler disposed radially outward of the face sheet, and a core configured to be disposed between the containment doubler and the face sheet.

With reference to FIG. 8, at 802, the method 800 may optionally include removing aluminum honeycomb from a portion of the core to be filled with filler material at 806. As an alternative option, the method 800 may include at 804 cutting the core, whether the core is made of aluminum honeycomb or is another configuration. Either of steps 802 and 804 may provide space for further components to be added in a retrofit scenario. However, if, for example, a replacement inner barrel panel is being assembled to be installed in an existing aircraft, then the core may be manufactured to be in separate parts without needing additional removal or cutting. For example, the replacement panel may include a fore core portion and an aft core portion. A similar configuration may be utilized in a method for assembling a new inlet cowl having a barrier device; alternatively, the new core may be manufactured whole and then cut or a portion may be removed as in steps 802 or 804.

At 806, the method 800 includes filling a portion of the core with filler material. If the portion has already been removed at 802, then the filler material will fill the empty space. If the portion is merely cut at 804, then the filler material may fill the spaces inside the honeycomb pattern, so that the hexagonal shapes within the portion each hold filler material. As discussed above, the filler material may include potting, adhesive, foaming adhesive, epoxy, etc. The filler material may require curing or drying in order to harden, or may be introduced to the acoustic panel core in a hard state.

At 808, the method 800 includes inserting the blade fragment barrier formed of one or more strips into the filler material so as to extend circumferentially at least partially around the opening and to occupy a radial distance between the containment doubler and the face sheet, such that the filler material is positioned forward of the blade fragment barrier. As discussed above, the blade fragment barrier may be inserted to circumferentially extend 360° around the inner barrel, or may have one or more gaps. Further, the blade fragment barrier may be inserted perpendicularly to the face sheet and the containment doubler (see, e.g., FIGS. 6A and 6D), or may be tilted (see, e.g., FIGS. 6B and 6C). The filler material may be positioned only forward of the blade fragment barrier, or may be positioned both forward and aft of the blade fragment barrier. The blade fragment barrier may be provided forward of a length midpoint of the containment doubler and aft of a forward edge of the containment doubler, which may increase fragment blocking efficacy while securing stability and strength of the barrier device. In addition, the one or more strips may include only one strip (e.g., a complete ring), or may include a plurality of strips. If a plurality of strips are included, the method may include overlapping each of the plurality of strips fore-to-aft with a neighboring strip at each end thereof. Accordingly, the ends of the strips may be protected by one another, preventing the ends from becoming a weak point of the barrier device.

At 810, the method 800 may include securing at least a portion of the blade fragment barrier with the containment doubler and the face sheet. With the containment doubler on the radial outside and the face sheet on the radial inside, and with the filler material additionally positioning the blade fragment barrier fore-to-aft, the entire blade fragment barrier may be held in place. In a situation in which the containment doubler and/or the face sheet is not continuous around the entire circumference of the blade fragment barrier, the containment doubler and the face sheet may still secure the portion of the blade fragment barrier that is covered.

A barrier device for blocking fan blade fragments from an aircraft engine is disclosed above which contains a blade fragment barrier installed within an inlet cowl inner barrel. The blade fragment barrier may function to block or catch blade fragments or other hazardous debris that would otherwise enter the interior of the inlet cowl. When an existing inlet cowl already includes a containment doubler, it can then be retrofitted with the blade fragment barrier to form the barrier device. In other implementations, new inlet cowls may be installed with the barrier device during initial assembly. Accordingly, the blockable range of a preexisting containment doubler can be extended without unduly adding weight forward of the doubler, which negatively impacts the aircraft.

It will be understood that the configurations and/or approaches described herein are exemplary in nature, and that these specific embodiments or examples are not to be considered in a limiting sense, because numerous variations are possible. The specific routines or methods described herein may represent one or more of any number of strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems, and configurations, and other features, functions, acts, and/or properties disclosed herein, as well as any and all equivalents thereof.

The invention claimed is:

1. A barrier device for an inlet cowl for an aircraft engine including an inner barrel circumferentially surrounding an opening in the inlet cowl formed along an axis of rotation of the aircraft engine, air passing through the opening to the aircraft engine, the inner barrel including a face sheet disposed on a radially inward side of the inner barrel relative to the axis, the barrier device comprising:
    a containment doubler of the inner barrel, disposed on a radially outward side of the inner barrel;
    a blade fragment barrier including a plurality of strips disposed between the containment doubler and the face sheet, so as to extend circumferentially at least partially around the opening and to occupy a radial distance between the containment doubler and the face sheet, each of the plurality of strips being offset circumferentially and parallel with each other; and
    a core disposed between the containment doubler and the face sheet, the plurality of strips being embedded into the core, wherein
    a thickness of the plurality of strips is greater than a wall thickness of the core.

2. The barrier device of claim 1, wherein the blade fragment barrier circumferentially extends 360° around the face sheet.

3. The barrier device of claim 1, further comprising filler material positioned forward of the blade fragment barrier, the plurality of strips being embedded into the filler material, wherein
    the filler material includes at least one of the group consisting of potting, adhesive, foaming adhesive, and epoxy.

4. The barrier device of claim 1, wherein the core is formed in a honeycomb pattern.

5. The barrier device of claim 1, wherein the blade fragment barrier is provided perpendicularly to respective surfaces of the face sheet and the containment doubler, or a top of the blade fragment barrier is tilted forward.

6. The barrier device of claim 1, wherein the blade fragment barrier is provided forward of a length midpoint of the containment doubler and aft of a forward edge of the containment doubler.

7. The barrier device of claim 1, wherein
    each of the plurality of strips overlaps fore-to-aft with a neighboring strip at each end thereof.

8. The barrier device of claim 1, wherein the plurality of strips are metallic.

9. The barrier device of claim 1, wherein each of the plurality of strips is an arc.

10. The barrier device of claim 1, wherein each of the plurality of strips is flat.

11. An inlet cowl for an aircraft engine, comprising:
    an inner barrel circumferentially surrounding an opening in the inlet cowl formed along an axis of rotation of the aircraft engine, air passing through the opening to the aircraft engine, the inner barrel including:
        a face sheet disposed on a radially inward side of the inner barrel relative to the axis;
        a containment doubler disposed radially outward of the face sheet; and
        a core disposed between the containment doubler and the face sheet; and
    a blade fragment barrier comprising a plurality of strips disposed between the containment doubler and the face sheet, so as to extend circumferentially at least partially around the opening and to occupy a radial distance between the containment doubler and the face sheet, each of the plurality of strips being offset circumferentially and parallel with each other and embedded into the core, wherein
    a thickness of the plurality of strips is greater than a wall thickness of the core.

12. The inlet cowl of claim 11, wherein the blade fragment barrier circumferentially extends 360° around the face sheet.

13. The inlet cowl of claim 11, further comprising filler material positioned forward of the blade fragment barrier, the plurality of strips being embedded into the filler material, wherein
    the filler material includes at least one of the group consisting of potting, adhesive, foaming adhesive, and epoxy.

14. The inlet cowl of claim 11, further comprising an outer barrel disposed radially outward of the inner barrel.

15. The inlet cowl of claim 11, wherein the core is formed in a honeycomb pattern.

16. The inlet cowl of claim 11, wherein the blade fragment barrier is provided perpendicularly to respective surfaces of the face sheet and the containment doubler, or a top of the blade fragment barrier is tilted forward.

17. The inlet cowl of claim 11, wherein the blade fragment barrier is provided forward of a length midpoint of the containment doubler and aft of a forward edge of the containment doubler.

18. The inlet cowl of claim 11, wherein
    each of the plurality of strips overlaps fore-to-aft with a neighboring strip at each end thereof.

19. A method for retrofitting a blade fragment barrier in an inlet cowl for an aircraft engine including an inner barrel circumferentially surrounding an opening in the inlet cowl formed along an axis of rotation of the aircraft engine, air passing through the opening to the aircraft engine, the inner barrel including a face sheet disposed on a radially inward side of the inner barrel relative to the axis; a containment doubler disposed radially outward of the face sheet; and a core configured to be disposed between the containment doubler and the face sheet, the method comprising:
    filling a portion of the core with filler material;
    embedding the blade fragment barrier formed of a plurality of strips into the core and filler material so as to extend circumferentially at least partially around the opening and to occupy a radial distance between the containment doubler and the face sheet, such that the filler material is positioned forward of the blade fragment barrier, each of the plurality of strips being offset circumferentially and parallel with each other; and securing at least a portion of the blade fragment barrier with the containment doubler and the face sheet, wherein a thickness of the plurality of strips is greater than a wall thickness of the core.

20. The method of claim 19, further comprising removing aluminum honeycomb from the portion of the core filled with the filler material.

* * * * *